United States Patent [19]

Gant

[11] 4,380,753
[45] Apr. 19, 1983

[54] TURN SIGNAL AND HAZARD SIGNAL CONTROL CIRCUIT

[76] Inventor: LeRoy A. Gant, 521 Jasmine La., Santa Maria, Calif. 93454

[21] Appl. No.: 275,544

[22] Filed: Jun. 19, 1981

Related U.S. Application Data

[62] Division of Ser. No. 95,549, Nov. 19, 1979, Pat. No. 4,302,748.

[51] Int. Cl.³ .................... B60Q 1/00; B60Q 1/40; B60Q 1/46
[52] U.S. Cl. ............................... 340/66; 340/64; 340/74; 340/81 R; 340/81 F; 307/10 LS
[58] Field of Search .................. 340/66, 67, 71, 72, 340/73, 74, 76, 81 R, 81 F, 82, 83, 84, 51, 64, 78; 200/61.27; 307/10 LS

[56] References Cited

U.S. PATENT DOCUMENTS 3,396,367  8/1968  Lohse .................................. 340/56
3,555,506  1/1971  Daws .................................. 340/56
4,087,784  5/1978  West .................................. 340/81 F Primary Examiner—John W. Caldwell, Sr.
Assistant Examiner—Donnie Lee Crosland
Attorney, Agent, or Firm—Fliesler, Dubb & Meyer

[57] ABSTRACT

An electronic control circuit for controlling left and right turn signal lamps including a turn signal circuit to activate the left or right lamp and then automatically deactivate either lamp after a predetermined time period, a hazard signal circuit to flash the left and right lamps simultaneously, a circuit to override the hazard signal circuit to activate the left or right lamp for the predetermined time period and then to reactivate the hazard signal circuit to flash the left and right lamps simultaneously, a circuit to deactivate one of the lamps during the predetermined time period and activate the other lamp, and a circuit to automatically activate the hazard signal circuit when an ignition switch is locked in a park position.

2 Claims, 2 Drawing Figures

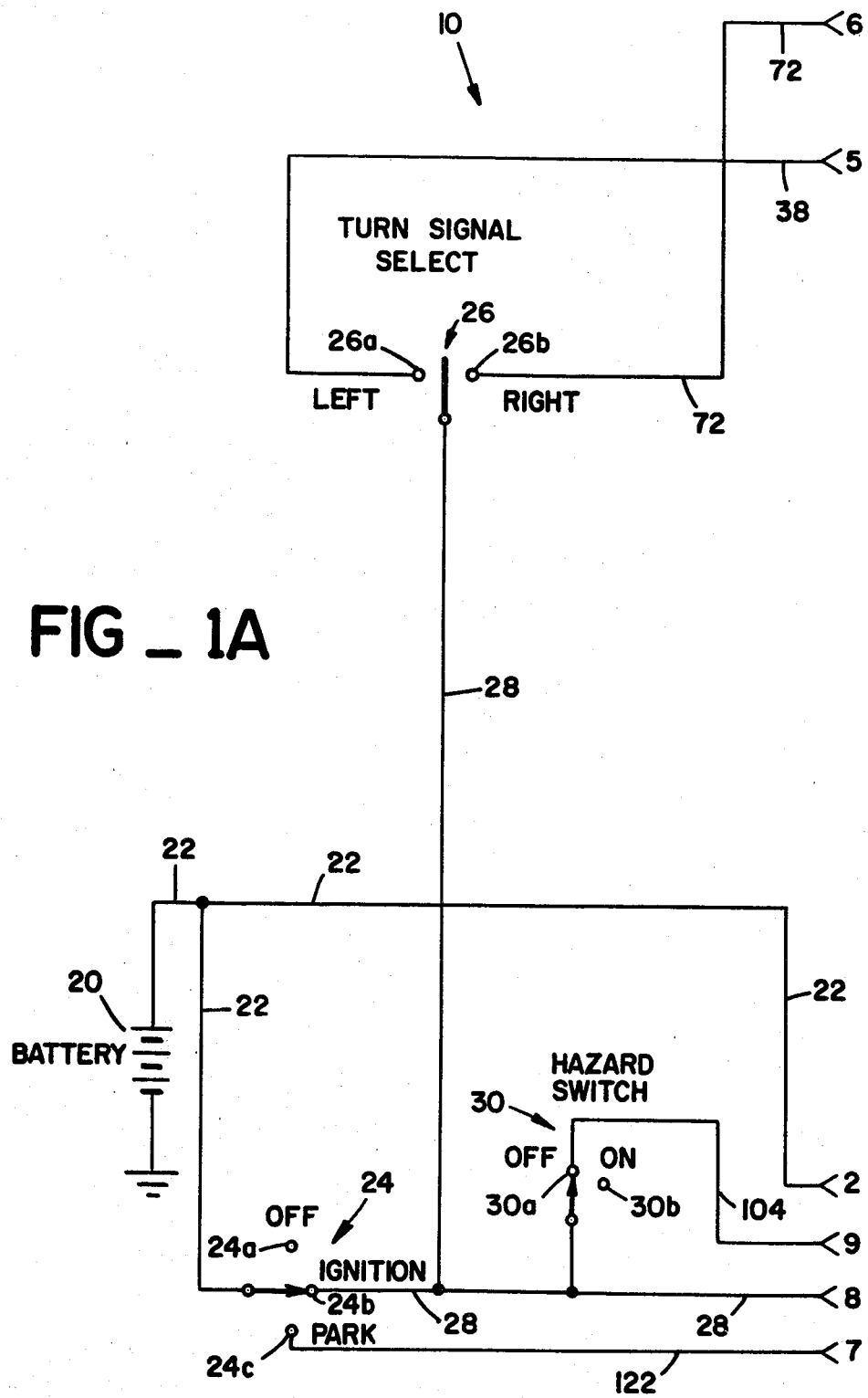
FIG_1A

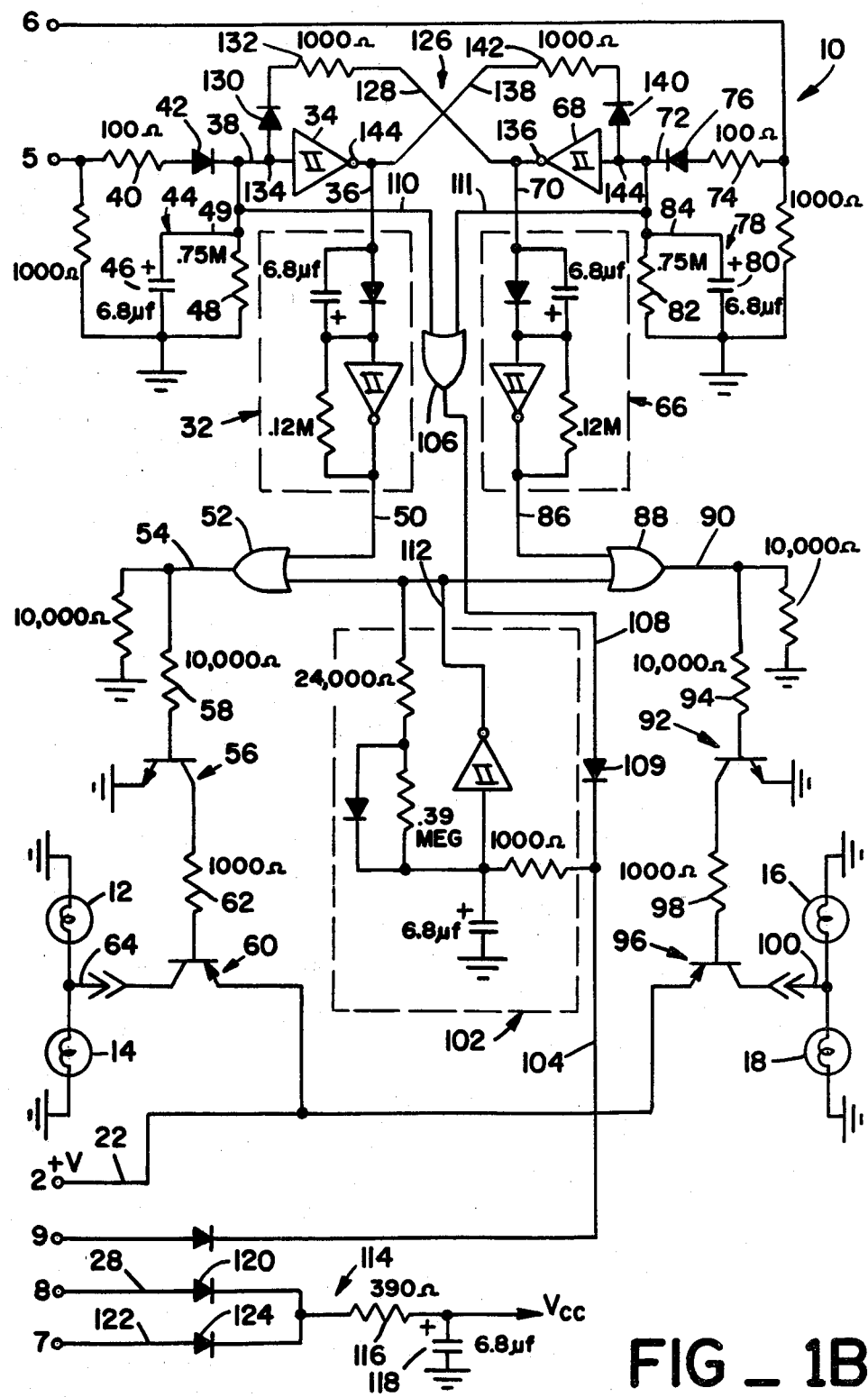
FIG_1B

TURN SIGNAL AND HAZARD SIGNAL CONTROL CIRCUIT

This is a division of Ser. No. 095,549, filed Nov. 19, 1979, now U.S. Pat. No. 4,302,748.

BACKGROUND ART

This invention relates to a turn signal and hazard signal control circuit for vehicles and, more particularly, to an electronic turn signal and hazard signal control circuit for particular use on motorcycles.

A wide variety of control circuits has been developed for actuating lamps to perform the typical turn signal and hazard signal functions. Generally, these control circuits have been designed for enclosed vehicles having steering wheels, such as automobiles, trucks and the like. As will be discussed below, smaller, open vehicles, such as motorcycles, have different turn signal and hazard signal requirements than the closed vehicles. However, the turn signal and hazard signal control circuits for the motorcycles are designed using the basic features of the control circuits for the closed vehicles and these are not entirely satisfactory.

In prior control circuits, the automobile operator will manually move a turn signal switch to the on position to activate a turn signal lamp preparatory to turning a corner or changing lanes. The steering wheel will mechanically and automatically return the switch to the off position after making the turn when the automobile again is being moved in a straight path. This is not feasible in a motorcycle since the handlebars and front wheel usually do not turn sufficiently to mechanically return the switch to the off position. Consequently, a motorcycle operator must manually move the switch to the on position and, after the turn, manually return the switch to the off position. Similarly, in making a lane change with either an automobile or a motorcycle, the steering mechanism will not turn sufficiently such that the switch will have to be returned manually to the off position.

This manual operation is a particular problem for motorcyclists and the general driving public. For example, after making a lane change or turning a corner, the motorcyclist may forget that the turn signal is activated and keep the switch in the on position. Those driving in the vicinity of the motorcyclist will think that another lane change or turn is about to be made and drive accordingly. A dangerous driving condition will exist any time inaccurate information is being conveyed by one vehicle operator to another.

Also, motorcyclists have the capability of and, in fact, do make rapid lane changes from, for example, the right lane to the left lane and back to the right lane. Therefore, for safer driving, the motorcyclist should be able to quickly signal for a left lane change and then quickly cancel the left lane change and signal the right lane change when operating the motorcycle in this manner. The prior control circuits do not activate and deactivate the turn signals optimally to meet these driving conditions.

Because of the small size and therefore reduced visibility of motorcycles, when riding a motorcycle in bad driving conditions such as fog, rain, or over dark roads, it usually is safer for the motorcyclist to actuate the hazard signal lamps. Control circuits are available for performing the hazard signal function during operation of a vehicle. However, when making a lane change or turning a corner during these driving conditions, it is desirable from a safety viewpoint to be able to override the hazard signal lamps to activate the turn signal lamps prior to making the change or turn, and then to automatically activate the hazard signal lamps again after the lane change or turn has been completed. Prior control circuits do not provide this feature.

Furthermore, when a motorcycle has broken down and is on the side of the road, the motorcyclist will want to activate the hazard signals and leave the area to seek assistance. Since the motorcycle is an open vehicle, with prior control circuits it is possible for a stranger to have easy access to the hazard switch to deactivate the hazard signals. This is not a problem with automobiles since the driver can lock the doors of the vehicle.

SUMMARY OF THE INVENTION

It is an object of the present invention to provide a novel electronic control circuit for controlling left and right turn signal lamps, as well as hazard signal lamps.

Another object of the present invention is to automatically cancel or inhibit the turn signal lamps a predetermined time period after activating these lamps.

Still another object of the present invention is to provide a control circuit which inhibits a selected one turn signal lamp during the predetermined time period when the other turn signal lamp is activated for quick lane change purposes.

Yet another object of the present invention is to override the hazard signal lamps to activate the turn signal lamps when making a lane change or turn, and then to return automatically to the hazard signal function when the lane change or turn signalling is completed.

A still further object of the present invention is to provide a control circuit which enables the motorcyclist to activate the hazard signal lamps and leave the motorcycle, while preventing others from deactivating these lamps.

These and other objects of the present invention are provided by an electronic control circuit for controlling left and right turn signal lamps, comprising switch means for selecting the left or the right turn signal lamp, first means for actuating the left turn signal lamp to flash on and off, second means for actuating a right turn signal lamp to flash on and off, and first and second means for automatically inhibiting the first and second actuating means, respectively, a predetermined time period after actuating the respective turn signal lamps.

The electronic control circuit also includes a means for overriding a selected one of the turn signal lamps during the predetermined time period to actuate the other of the turn signal lamps for the predetermined time period. The invention further comprises means for automatically overriding a hazard signal means to actuate the left or right turn signal lamps and to then automatically activate the hazard signal means again after the predetermined time period. In addition, the control circuit includes a circuit which automatically activates the hazard signal lamps when the ignition switch is locked in a park position with the ignition key removed, and prevents deactivation of the hazard signal lamps until the key is inserted in the ignition switch and the switch moved from the park position to another position.

BRIEF DESCRIPTION OF THE DRAWINGS

FIGS. 1A and 1B illustrate schematically, the electronic control circuit of the present invention.

DETAILED DESCRIPTION OF THE DRAWINGS

FIG. 1B illustrates an electronic control circuit 10 which controls four lamps 12, 14, 16 and 18 to perform turn signal and hazard signal functions. The lamps 12 and 14 are placed at the left front and left rear of the vehicle, respectively, while the lamps 16 and 18 are placed at the right front and right rear of the vehicle, respectively. The circuit 10 is designed specifically for a motorcycle to aid the motorcyclist; however, it will become apparent that the invention has application to most any other vehicle.

Furthermore, FIG. 1B shows the specific interconnections and values of various components corresponding to a commercial embodiment, but these need not be and will not be discussed in detail for an understanding of the present invention.

As shown in FIG. 1A, a power and control signal supply for the circuit 10 is provided by the vehicle battery 20 over a branched line 22, one branch of which leads to an ignition switch 24. The switch 24 has an off position 24a, an ignition position 24b and a park position 24c. A turn signal select switch 26, which is a momentary switch, is connected to the battery 20 over a line 28 with the switch 24 in the ignition position 24b. The switch 26 has a left turn signal position 26a and a right turn signal position 26b.

A hazard signal switch 30, which is a toggle switch, is connected to the battery 20 over the line 28 with the switch 24 in the ignition position 24b. The switch 30 has an off position 30a and an on position 30b.

An oscillator 32 shown in FIG. 1B is activated by the output of an inverter 34 over a line 36. The input to the inverter 34 is a control signal on a line 38 which is connected to the left turn position 26a of the switch 26 through a resistor 40 and a diode 42.

An RC timing circuit 44 has a capacitor 46 and a resistor 48. The capacitor 46 is charged to the voltage +V of the battery 20 by the control signal on the line 38 over a line 49 and discharges through the resistor 48 to ground. The timing circuit 44 inhibits or deactivates the oscillator 32 a predetermined time period after generating the control signal on line 38.

When activated, the oscillator 32 generates output pulses over a line 50, which are gated through an Or gate 52 to an output line 54. A transistor 56 is biased on and off by the pulses on line 54 via a base resistor 58 to bias on and off a transistor 60 through its base resistor 62. When the transistor 60 is on, the battery voltage +V is coupled directly over the line 22 through the transistor 60 to the lamps 12 and 14 over a line 64 to actuate the latter.

An oscillator 66 is activated by the output of an inverter 68 over a line 70. The input to the inverter 68 is a control signal on a line 72 leading to the right turn position 26b of the switch 26 through a resistor 74 and a diode 76.

An RC timing circuit 78 has a capacitor 80 and a resistor 82. The capacitor 80 is charged by the control signal on the line 72 over a line 84 and discharges through the resistor 82 over the line 84 to ground. The timing circuit 78 inhibits or deactivates the oscillator 66 a predetermined time period after generating the control signal on line 72.

When activated, the oscillator 66 generates pulses over a line 86 which are gated through an Or gate 88 to an output line 90. A transistor 92 is biased on and off by the pulses on line 90 through a base resistor 94 and biases on and off a transistor 96 through a base resistor 98. When the transistor 96 is biased on, the battery supply voltage +V is coupled from the line 22 through the transistor 96 to a line 100 to actuate the lamps 16 and 18.

An oscillator 102 is activated by a control signal on a line 104 leading to the off position 30a of the hazard switch 30. The oscillator 102 also is activated by the output of an Or gate 106 over a line 108 having a diode 109. One input to the Or gate 106 is a signal on a line 110 coupled to a junction between the line 38 and the line 49. The other input to the gate 106 is a signal on a line 111 coupled to a junction between the line 72 and the line 84. When activated, the oscillator 102 generates output pulses on a line 112. The pulses are gated simultaneously through the Or gate 52 and the Or gate 88 to turn on and off the transistors 56, 60 and transistors 92, 96 to simultaneously actuate the lamps 12, 14, 16 and 18 for the hazard signalling function.

The inverters 34 and 68, as well as the inverters (unnumbered) shown in the oscillators 32, 66 and 102 are implemented by a Schmitt trigger using CMOS technology. The Or gates 52, 88 and 106 are implemented also using CMOS technology. A power supply $V_{cc}$ for these components, as shown in the drawings, is provided by a circuit referenced generally at 114 having a resistor 116 and a capacitor 118. With the switch 24 in the ignition position 24b, the battery supply 20 is coupled over the line 22 and line 28 through a diode 120 of the circuit 114, to the resistor 116 and capacitor 118 to produce the supply $V_{cc}$. When the switch 24 is in the park position 24c, the battery supply 20 is fed over the line 22 to a line 122 and over a diode 124 to the resistor 116 and capacitor 118 to produce supply $V_{cc}$.

A cross coupling network 126 permits rapid changes in turn signalling between a left turn signal and a right turn signal. The network 126 includes one line 128 having a diode 130 and a resistor 132 coupled at one end 134 to the line 38 and at another end 136 to the virtual ground of the inverter 68. Another line 138 of the network 126 includes a diode 140 and a resistor 142 with one end 144 coupled to the line 72 and another end 144 connected to the virtual ground of the inverter 34.

In operation, assume that a motorcycle is being driven on the road and that the key is in the ignition switch 24 in the ignition position 24b. Also assume that the turn signal select switch 26 is off, i.e., not in the left turn position 26a or the right turn position 26b, and that the hazard switch 30 is in the off position 30a. In this condition, a control signal of logic 0 is supplied over the line 38 and inverted by the inverter 34 to provide a logic 1 on the line 36 to inhibit or deactivate the oscillator 32. Similarly, a control signal of logic 0 is supplied on the line 72 and inverted by the inverter 68 to produce a logic 1 on the line 70 which inhibits or deactivates the oscillator 66. Also, with the switch 30 in the off position, a control signal of logic 1 is supplied on the line 104 to inhibit or deactivate the oscillator 102. Also at this time, a control signal of logic 0 is produced on the line 110 and the line 111 since switch 26 is off, whereby the output of gate 106 on line 108 is logic 0. However, since a logic 1 is on the line 104 the oscillator 102 remains in its deactivated state.

Now, assume, for example, that the motorcyclist is about to change lanes from the right lane to the left lane. The momentary switch 26 will be moved to the left turn position 26a to produce a control signal on line 38 of a logic 1. This control signal on line 38 is inverted by the inverter 34 to produce a logic 0 on the line 36 and thereby to activate the oscillator 32. As a result, the output pulses of the oscillator 32 on the line 50 are gated through the gate 52 to turn on an off transistors 56 and 60, causing left turn signals 12 and 14 to flash on and off.

When the control signal of logic 1 appears on the line 38, the capacitor 46 will be charged to the battery voltage via the line 49. As the switch 26 returns to its off position, which occurs almost immediately since it is a momentary switch, the capacitor 46 begins to discharge through the line 49 and resistor 48 to ground. When the capacitor 46 discharges to the lower threshold of the inverter 34, i.e., when it discharges to a level of a logic 0, the output on line 36 goes high to inhibit or deactivate the oscillator 32. Consequently, at this time the left turn signal lamps 12 and 14 are automatically turned off.

The timing circuit 44 can have a time constant of, for example, five seconds. Thus, five seconds after the switch 26 is moved to the left turn position 26a and quickly returned to the off position shown, the oscillator 32 will be deactivated to automatically cancel the left turn signal function. If the motorcyclist wants to continue the left turn signal function beyond the five second period, the switch 26 need merely be moved again to the left turn position 26a.

Assume now that the motorcyclist is operating the motorcycle in the left lane and is about to make a lane change to the right lane. The momentary switch 26 will be moved to the right turn position 26b. This will produce a control signal of logic 1 on the line 72 which will be inverted by the inverter 68 to produce a logic 0 on the line 70 and, thereby, activate the oscillator 66. Hence, output pulses will be produced by the oscillator 66 on the line 86 and these will be gated through the gate 88 to bias on and off the transistors 92 and 96 to cause flashing of the right turn lamps 16 and 18.

The control signal of logic 1 on line 72 also causes the capacitor 80 to charge to the battery supply voltage via the line 84. When the switch 26 is returned to the off position, which occurs almost immediately, the capacitor 80 begins to discharge via the line 84 and resistor 82 to ground. When the capacitor 80 discharges to the lower threshold of the inverter 68 corresponding to a logic 0 on line 72, the signal on line 70 will be switched to the logic 1 state, whereby the oscillator 66 will be inhibited or deactivated to turn off the lamps 16 and 18. Thus, in a similar manner as the timing circuit 44, the timing circuit 78 can be set to a predetermined period of five seconds to automatically deactivate the oscillator 66 and cancel the right turn signal function.

Assume now that the motorcyclist is in the right lane, and desires to change to the left lane followed by a return to the right lane within the predetermined time period of five seconds. When changing from the right lane to the left lane, the switch 26 will be moved to the left turn position 26a to activate the left turn signals 12 and 14, as described above. The oscillator 32 normally will be activated for the five second period.

However, in returning to the right lane within this five second period, the motorcyclist will move the switch 26 to the right turn position 26b. As a result, the signal on line 72 will go to a logic 1 and this will be inverted by the inverter 68 to produce a logic 0 on the line 70 to activate the oscillator 66. When this occurs, the cross coupling network 126 provides a rapid discharge path for the capacitor 46 via the line 49, the junction 134, the diode 130, the resistor 132 and the end 136 to the virtual ground of the inverter 68. Consequently, almost immediately a logic 0 is produced at the input of the inverter 34 to result in a logic 1 on the line 36 which disables the oscillator 32.

In a similar manner, the cross coupling network 126 produces a rapid discharge path for the capacitor 80 when the switch 26 is moved to the left turn position 26a within the five second period after moving the switch 26 to the right turn position 26b. This rapid discharge path is provided from the capacitor 80 through the line 84, the junction 144, the diode 140, the resistor 142 and the end 144 to the virtual ground of the inverter 34.

Assume now that, for example, a foggy weather condition exists such that the motorcyclist wants to activate the hazard signal function while riding on the road. The hazard switch 30 is now moved from the off position 30a to the on position 30b. This will produce a control signal of logic 0 on the line 104 to activate the oscillator 102. Consequently, output pulses from the oscillator 102 on the line 112 are gated simultaneously through the gate 52 and the gate 88 to turn on and off the transistors 56, 60 and 92, 96, respectively. Therefore, the lamps 12 and 14 and the lamps 16 and 18 will simultaneously flash on and off to provide the hazard signal function.

Now assume that with the lamps 12, 14, 16 and 18 being activated for the hazard signal function as just described, that the motorcyclist is about to change lanes from the right lane to the left lane. The switch 26 will be moved to the left turn position 26a to activate the oscillator 32 as already described. Simultaneously, a control signal of logic 1 will be produced on the line 110, which will be gated by the gate 106 to the output line 108 to override the logic 0 on the line 104 and, thereby, deactivate the oscillator 102. As a result, the lamps 12 and 14 will continue to be activated to signal a left lane change, while the lamps 16 and 18 will be turned off. Then, after the above-mentioned predetermined time period of five seconds, the capacitor 46 will have discharged to provide a logic 0 at the input to inverter 34 and to the gate 106, resulting in the left turn signal function being automatically cancelled, and the oscillator 102 automatically reactivated to provide again the hazard signal function. A similar operation occurs should the motorcyclist signal for a lane change from the left to the right lane when the lamps 12, 14 16 and 18 are in the hazard signal condition.

Assume now that while on the road, the motorcycle breaks down and the motorcyclist stops the motorcycle on the side of the road. Also, assume that the switch 24, the switch 26 and the switch 30 are in the positions shown so that the lamps 12, 14, 16 and 18 are not activated either for the turn signal or hazard signal function. The motorcyclist can then turn the ignition switch 24 from the ignition position 24b to the park position 24c and remove the ignition key to lock the switch 24 in the park position 24c. Automatically, therefore, the battery supply 20 is removed from the line 28 to produce a logic 0 on the line 104. Consequently, the oscillator 102 will be activated as already described to cause the lamps 12, 14, 16 and 18 to flash on and off for the hazard signal function. Since the switch 24 is locked in the park position 24c, this hazard signal function cannot be cancelled until the motorcyclist inserts the key and returns the switch 24 from the park position 24c to the ignition position 24b. Therefore, the motorcyclist can leave the area with the lamps 12, 14, 16 and 18 activated in the hazard signal condition and no one else can cancel this.

Note that when the switch 24 is in the ignition position 24b, and the switch 26 off, the hazard signal function is dependent on the state of the switch 30. When the switch 30 is in the off position 30a, the lamps 12-18 will not be flashing. When switch 30 is in the on position, the lamps 12-18 will be flashing. However, when the switch 24 is in the park position 24c, the hazard signal function is not dependent on the state or position of switch 30 and the lamps 12-18 will be flashing.

In addition to the advantages already indicated, the circuit 10 is a solid state unit which can replace standard, thermally controlled "flashers" in controlling and operating the lamps 12-18. Furthermore, the duty cycle of the oscillator 102 can be made low to reduce the drain on the battery 20 when activating the hazard signal function, yet allow the lamp filaments to reach full intensity. The entire circuit 10 can be encapsulated in a solid epoxy resin to withstand weather, vibration and shock.

I claim:

1. An electronic control circuit for controlling left and right turn signal lamps of a vehicle, comprising:

(a) an ignition switch having an off position, an ignition position and a park position;
(b) means for supplying electrical power through said ignition switch when said switch is in said ignition position or said park position;
(c) means for flashing the left turn signal lamp and the right turn signal lamp on and off simultaneously in response to the electrical power; and
(d) two-state hazard switch means, connected to said ignition position of said ignition switch, for activating said flashing means when said ignition switch is in said ignition position dependent on the state of said hazard switch means and for automatically activating said flashing means when said ignition switch is in said park position independent of the state of said hazard switch means.

2. An electronic control circuit according to claim 1 wherein said hazard switch means comprises an on-off switch having an off position at which activating electrical power from said supplying means is coupled to said flashing means to deactivate said flashing means and having an on position at which the activating electrical power from said supplying means is decoupled from said flashing means to activate said flashing means.

* * * * *